US008671015B1

(12) United States Patent
Brandt et al.

(10) Patent No.: US 8,671,015 B1
(45) Date of Patent: Mar. 11, 2014

(54) AUGMENTING ADVERTISEMENT KEYWORDS TO INCREASE CONVERSION RATE

(75) Inventors: David Richard Brandt, Issaquah, WA (US); John Todd Larason, Renton, WA (US); Eric Alfred Herrmann, Snohomish, WA (US); Stephan G. Betz, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1381 days.

(21) Appl. No.: 11/833,186

(22) Filed: Aug. 2, 2007

(51) Int. Cl.
*G06Q 30/00* (2012.01)
(52) U.S. Cl.
USPC .......................................................... 705/14
(58) Field of Classification Search
USPC ..................................... 707/999.003; 705/14
See application file for complete search history.

(56) References Cited

U.S. PATENT DOCUMENTS

| 7,664,740 | B2 * | 2/2010 | Starbuck et al. ....... 707/999.003 |
| 7,792,858 | B2 * | 9/2010 | Tang et al. .................... 707/780 |
| 2003/0220837 | A1 * | 11/2003 | Asayama ......................... 705/14 |
| 2005/0027699 | A1 * | 2/2005 | Awadallah et al. ................ 707/3 |
| 2008/0052152 | A1 * | 2/2008 | Yufik ............................... 705/14 |

* cited by examiner

*Primary Examiner* — Saba Dagnew
(74) *Attorney, Agent, or Firm* — Novak Druce Connolly Bove + Quigg LLP

(57) ABSTRACT

A method and system for augmenting keywords, submitted to advertisement placement services, that are not performing as expected is provided. An advertisement system analyzes the performance of keywords of advertisement sets submitted with advertisement placement services, such as search engine services. Based on the analysis, the advertisement system identifies keywords that are candidate keywords for augmentation. The advertisement system then identifies augmentation terms for the candidate keywords. The advertisement system then augments the candidate keyword of an advertisement set with the augmentation term and submits that augmented advertisement set with the augmented keyword to an advertisement placement service.

38 Claims, 8 Drawing Sheets

AUGMENTING ADVERTISEMENT KEYWORDS TO INCREASE CONVERSION RATE

TECHNICAL FIELD

The described technology relates generally to identifying keywords for advertisements that are keyword-targeted.

BACKGROUND

Many search engine services, such as Google, Yahoo!, and MSN, provide for searching for information that is accessible via the Internet. These search engine services allow users to search for web pages and other Internet-accessible resources that may be of interest to users. After a user submits a search request that includes search terms, the search engine service identifies web pages that may be related to those search terms. The collection of web pages that most closely match the search terms is referred to as the "search result." The search engine service then ranks the web pages of the search result based on the closeness of each match, web page popularity (e.g., Google's page ranking), and so on. The search engine service then displays to the user links to those information sources in an order that is based on their rankings.

Some search engine services do not charge a fee to users or to the providers of web pages for including links to their web pages in search results. Rather, the search engine services obtain revenue by placing advertisements along with search results and charging the advertisers when a user selects an advertisement. These paid-for advertisements are commonly referred to as "sponsored links," "sponsored matches," or "paid-for search results." An advertiser who wants to place an advertisement along with certain search results provides a search engine service with an advertisement set that includes a creative (or advertisement), a keyword, and a link to a landing page of the advertiser. Advertisers often refer to banner advertisements and other forms of created advertisements as a "creative." When a search request is received, the search engine service identifies the advertisement sets whose keywords match those of the search request. The search engine service then may display the creative (which may include the link to the landing page) of some of the advertisement sets along with the search results. When a user clicks on a creative (e.g., a "clickthrough") to visit the landing page, the search engine service may charge a fee to the advertiser.

Advertisers use various techniques to identify words or phrases that may be potentially good keywords for advertisement sets. One such technique analyzes queries submitted to a web site by users searching for products to purchase. If certain queries tend to result in significant financial benefit (e.g., significant profits or higher conversion rate), then the words of those queries may be good keywords. A user who submits a query to a general search engine service, however, may have reasons for submitting the query other than for purchasing a product related to the query. For example, a person who submits the name of a song as a query may be interested in locating the lyrics of the song, and not interested in buying a CD containing the song. As such, queries that are selected from product searches sometimes do not perform as well as an advertiser might expect when used as keywords of advertisement sets submitted to a general search engine service.

DETAIL DESCRIPTION

Figure 1:
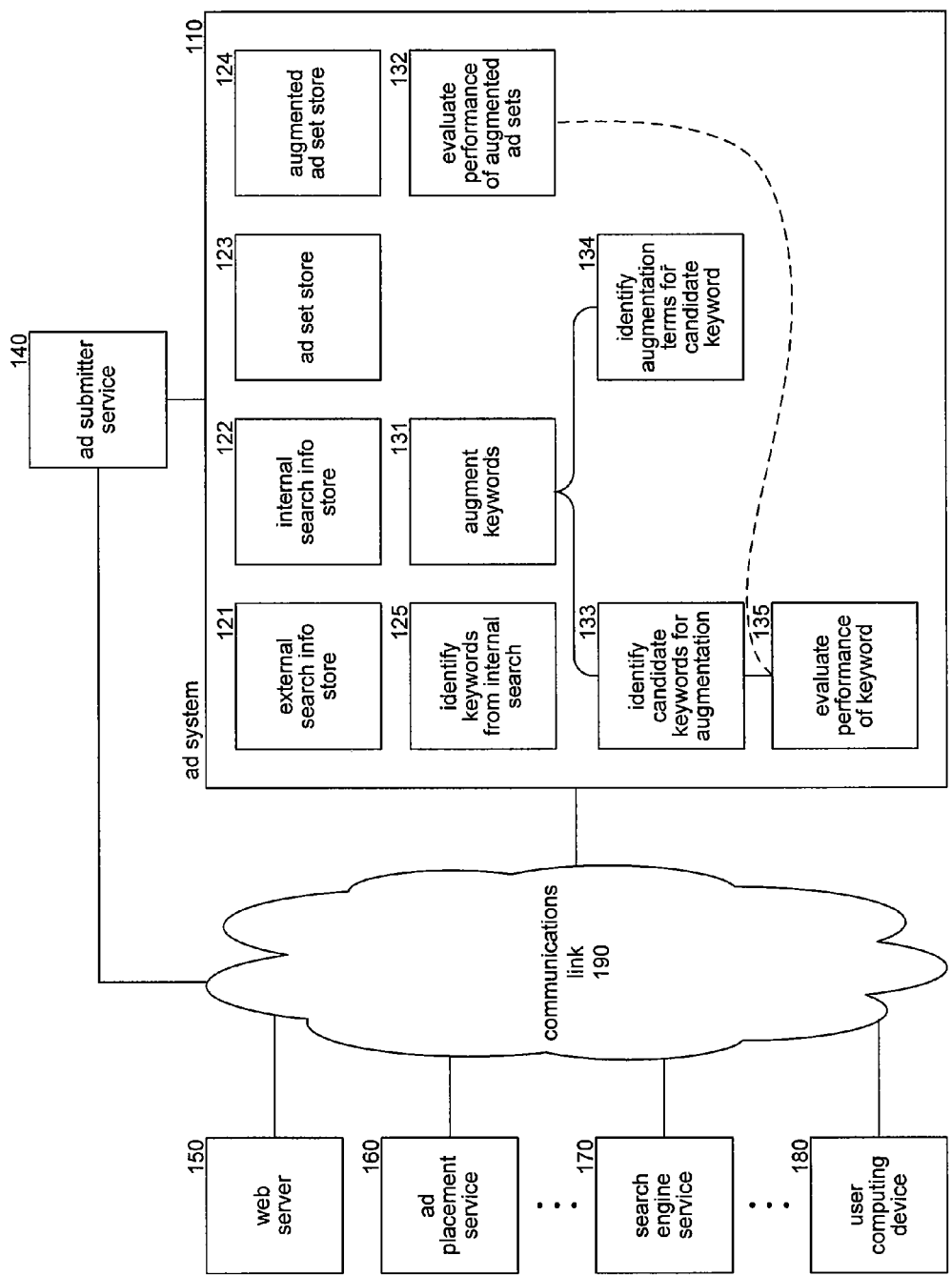
FIG. 1 is a block diagram that illustrates components of an advertisement system in some embodiments.

A method and system for augmenting keywords, submitted to advertisement placement services, that are not performing as expected is provided. In some embodiments, an advertisement system analyzes the performance of keywords of advertisement sets submitted with advertisement placement services, such as search engine services. The analysis may be based on the conversion rate for clickthroughs. The conversion rate refers generally to the fraction of clickthroughs that result in benefit to the advertiser (e.g., purchases of a product). Based on the analysis, the advertisement system identifies keywords that are candidate keywords for augmentation. Augmentation is a process of adding additional terms to a keyword of an advertisement set. For example, the keyword "Harry Potter" may be augmented by adding the augmentation term "DVD" resulting in an augmented keyword of "Harry Potter DVD." A keyword may be considered a candidate keyword when the performance of the keyword satisfies an augmentation criterion. For example, the augmentation criterion may specify that the conversion rate of the keyword is below a threshold rate or that the conversion rate is lower than an expected conversion rate that is based on the conversion rate of searches of an electronic catalog using that same keyword.

After identifying the candidate keywords, the advertisement system identifies augmentation terms for the candidate keywords. The advertisement system may identify augmentation terms that are specific to a category of the items being advertised. For example, if the clickthrough of a creative takes the user to a search landing page that shows search results of the keyword submitted as a search request for items in a certain category, then the augmentation term may be specific to that category. The augmentation term for the category of DVDs may be "DVD," and the augmentation term for a category of closeout items may be "bargains." The advertisement system then augments the candidate keyword of an advertisement set with the augmentation term and submits that augmented advertisement set with the augmented keyword to an advertisement placement service. Because an augmented keyword is more specific than the keyword itself, an advertisement placement service will typically only select an augmented advertisement set for placement in a context that relates to the augmentation term. As a result, the advertisement placement service will typically select an augmented advertisement set less frequently than the un-augmented advertisement set and in more specific contexts. Thus, the conversion rate of the augmented advertisement set will likely be higher than that of the corresponding un-augmented advertisement set.

In some embodiments, the advertisement system may be used to augment keywords selected on the basis of an analysis of search logs of a search service. For example, the web site of an advertiser may provide a search service for searching an electronic catalog of items (e.g., product, services, information) that are for sale or otherwise provided by the advertiser. Such a search service may be referred to as an internal search service to differentiate it from a search engine service that is external to the web site (i.e., an external search service). When a visitor to the web site submits a search request to the internal search service, the search engine identifies items within the electronic catalog that match the search request and provides to the visitor search results with links to web pages of those matching items. The search service may add an entry to a search log that specifies each search request and its search results. The web site may also track when the visitor selects a link of the search result and whether the submission of the search request resulted in some financial benefit to the advertiser. For example, the financial benefit may be that the visitor purchased an item after selecting a link for that item from the search result. The search log may contain information useful in correlating search requests to the corresponding financial benefit.

An advertiser may analyze (e.g., using an automated advertisement generator) search information such as a search log and related purchase information to identify from the search terms of the search log that are potentially good keywords for advertisement sets. For example, analysis of the search information may indicate that the term "Pearl Jam" submitted to the internal search service has a high conversion rate resulting in significant financial benefit to the advertiser because of purchases of CDs. In such a case, the advertiser may generate an advertisement set with the keyword "Pearl Jam" and a landing page that displays results of a search of the advertiser's electronic catalog with the search term "Pearl Jam" for the category of CDs. The conversion rate of such an advertisement set with an external search service, however, may not be as high as the conversion rate for the internal search service. The reasons for a difference in the conversion rates may be that users of external search services when they submit the search request of "Pearl Jam" may not be interested in purchasing a CD. Rather, the users may be interested in obtaining a copy of the lyrics of the group, obtaining information about the history of the group, purchasing tickets for an upcoming concert, and so on. In contrast, a visitor to a commercial web site who submits the search request "Pearl Jam" to an internal search service is likely to be interested in purchasing a CD.

The advertisement system identifies keywords of advertisement sets that are not performing up to expectation and augments the keywords with augmentation terms. In the case of the keyword "Pearl Jam," the advertisement system may augment the keyword with the augmentation term of "CD." Thus, an advertisement placement service would only select the advertisement set with the augmented keyword "Pearl Jam CD" for placement when a search request specifically included the augmentation term. Thus, the augmented advertisement set would likely be selected for placement when users are specifically interested in CDs in some way (e.g., to purchase or to find release date). As a result, the augmented advertisement set is less likely to be selected for placement when users are interested in lyrics, concert information, and so on.

As mentioned above, the advertisement system may identify keywords that satisfy an augmentation criterion as candidate keywords. The augmentation criterion may be based on comparison of the conversion rates (or some other financial benefit metric) for that keyword at an internal search service and an external search service. If the conversion rate of the internal search service is much higher than the conversion rate of the external search service, then the keyword is not performing as expected and, for various reasons, may not be a good choice of a keyword for an external search service. The advertisement system may specify an augmentation criterion in which the difference between the internal conversion rate and the external conversion rate is more than a minimum threshold difference. For example, if the internal conversion rate is 0.07 and the external conversion rate is 0.04 for a keyword and the threshold difference is 0.02, then the keyword would satisfy the augmentation criterion because the difference of 0.03 is greater than the minimum threshold difference of 0.02. If however, the minimum threshold difference is 0.04, then the keyword would not satisfy the augmentation criterion because the difference of 0.03 is less than the threshold difference of 0.04. The advertisement system, alternatively or in addition, may specify an augmentation criterion that is based on a threshold percentage difference between the internal conversion rate and the external conversion rate. Continuing with the example, if the threshold percentage difference is 25%, then the keyword would satisfy the augmentation criterion because the percentage difference of 43% (i.e., (0.07-0.04)/0.07) is greater than the threshold percentage difference of 25%. If, however, the threshold percentage difference is 50%, then the keyword would not satisfy the augmentation criterion because the percentage difference of 43% is less than the threshold percentage difference of 50%. As another example, the advertisement system may specify an augmentation criterion that is based on the external conversion rate for the keyword and the popularity of the keyword as a search request for the internal search service. For example, the augmentation criterion may be satisfied when the external conversion rate is below a threshold conversion rate and the popularity of the keyword is above a certain threshold popularity level. One skilled in the art will appreciate that an augmentation criterion may be specified using many different financial metrics such as revenue and profitability and non-financial metrics such as increasing traffic to a web site.

In some embodiments, the advertisement system may apply augmentation criteria that are category-specific. Some categories of products such as plasma televisions may have a higher profit margin than other categories such as books. In such a case, when an advertisement set is used to advertise high-profit products, a relatively low conversion rate may still be very profitable for the advertiser. In contrast, when an advertisement set is used to advertise low-profit products, a relatively low conversion rate may be not profitable for the advertiser. In such a case, the advertisement system may use an augmentation criterion that is specific to the category of product being advertised. For example, the augmentation criterion for the plasma television category may specify a difference threshold of 0.05, whereas the augmentation criterion for a book category may specify a difference threshold of 0.02.

In some embodiments, the advertisement system may select augmentation terms that are category-specific. Some augmentation terms that are appropriate for one category of products may not be appropriate for another category of products. For example, the augmentation term "CD" might not be appropriate when advertising a plasma television. As another example, the term "bargain" may not be appropriate when advertising a plasma television that is offered at the manufacturer's suggested retail price. The advertisement system may maintain a table that includes for each category of items a list of the augmentation terms for that category. The advertisement system may use various techniques for identifying which of the augmentation terms to use for a keyword. For example, the augmentation terms may be ordered in the list based on anticipated effectiveness. The advertisement system may initially select the first augmentation term of the list for a keyword. If the advertisement set with that first augmentation term satisfies a re-augmentation criterion (i.e., performs poorly), then the advertisement system may re-augment that keyword with the second augmentation term list. The advertisement system may repeat this process until the re-augmentation criterion is not satisfied for an augmentation term. The advertisement system may also select augmentation terms on a round-robin basis regardless of effectiveness of the prior augmentation term or on a random basis when the current augmented advertisement set satisfies the re-augmentation criterion. A re-augmentation criterion may be the same as the augmentation criterion or may be a different criterion.

In some embodiments, the augmentation terms may be classified as commercial augmentation terms or product augmentation terms. The commercial augmentation terms may include terms such as "buy," "purchase," "bargain," "sale," "discount," and so on. The product augmentation terms may include terms that are category- or product-specific such as "DVDs," "CDs," "books," "classical," "rock," and so on. In some embodiments, the advertisement system may identify augmentation terms from category or product descriptions within an electronic catalog. For example, when a specific product is being advertised, the advertisement system may identify significant terms within the product description as potential augmentation terms. The advertisement system may use various metrics, such as a term-frequency-by-inverse-document-frequency (tf*idf) metric, to identify significant terms. The significant terms can be used to augment the keywords used in advertising that product. The advertisement system may also select augmentation terms from the text of the landing page. The advertisement system may use various techniques to identify landing page augmentation terms such as a term-frequency-by-inverse-document frequency metric. Such augmentation terms may be classified as landing page augmentation terms. Each class of augmentation terms may have lists of its augmentation terms. For example, the category-specific augmentation class may have a list for each category of products.

When the landing page of an advertisement set is to a general search result page, rather than a category-specific search result page, the advertisement system may consider the advertisement set to be for a general category or may try to identify a likely specific category for the advertisement set. In some embodiments, the advertisement system may submit to an internal search service the keyword of such an advertisement set as a search request for a general search. The advertisement system may then analyze the results of the search to determine an appropriate specific category for the advertisement set. For example, if the keyword is "Harry Potter," then the search results of a general product search may include products from the categories of books, CDs, DVDs, games, consumer products, and so on. In such a case, the advertisement system may count the number of products of the search result in each category and select the category with the highest number of products as the specific category for the advertisement set. Alternatively, the advertisement set may only select a specific category when the number of products in a category is higher than a threshold percentage (e.g., 50%) of the products in the search results.

In some embodiments, the advertisement system may select several augmentation terms for a keyword and generate different augmented advertisement sets, each with the keyword augmented with a different augmentation term. The advertisement system may also augment a keyword with multiple augmentation terms from the same or different classes of augmentation terms. For example, the advertisement system may select a commercial augmentation term and a product augmentation term to add to a keyword. For example, if the keyword is "Harry Potter," then the augmentation terms may be "books" and "new release" giving the augmented keyword of "Harry Potter books new release." The advertisement system either may continue to submit the un-augmented advertisement set along with the augmented advertisement set for placement or may cause only the augmented advertisement set to be submitted. The advertisement system may use an indication of the performance of one augmentation term when identifying another augmentation term. For example, if one class of augmentation terms is not achieving desired results for a certain keyword, then the advertisement system may select augmentation terms from a different class. A search engine marketing company may also use the advertisement system to identify augmentation terms based on past performance of augmentation terms.

In some embodiments, when the landing page of an augmented advertisement set is a search page, the advertisement system may submit a search request that includes only the original keyword without the augmentation term. For example, if the augmented keyword is "Harry Potter purchase," then the advertisement system may specify that the search request for the search landing page should be "Harry Potter." The advertisement system may remove such an augmentation term because the augmentation term is unlikely to help in identifying a product that may be of interest to the user. Indeed, the use of an augmentation term such as "purchase" may give unwarranted weight to products that just happen to use the term "purchase" in their descriptions. The advertisement system may use other techniques to reduce the influence of the augmentation term, such as by ranking the search results based only on the keyword. In some cases, the advertisement system may also want to increase the influence of the augmentation term. Depending on the specific algorithm of the internal search service, the advertisement system may include the augmentation term as the first term of the search request followed by the original keyword or may rank the search results based on the augmentation term.

FIG. 1 is a block diagram that illustrates components of an advertisement system in some embodiments. The advertisement system 110 may be connected to a communications link 190 that is also connected to an advertisement submitter service 140, a web server 150, advertisement placement services 160, search engine services 170, and user computing devices 180. The advertisement system 110 includes various data stores such as an external search information store 121, an internal search information store 122, an advertisement set store 123, and an augmented keyword store 124. The external search information store 121 may contain information relating to the placement of advertisement sets by the search engine services and other advertisement placement services. The internal search information store 122 may contain information relating to internal searches of an electronic catalog by an internal search service provided by the web server 150. The information of these stores may include conversion rate, revenue, profitability, and other financial benefit information. The advertisement set store 123 may contain an indication of the advertisement sets that have been submitted to an advertisement placement service via the advertisement submitter service 140. The augmented keyword store 124 may contain an indication of each augmented advertisement set with an augmented keyword. The advertisement system 110 may also include an identify keywords from internal search component 125 that identifies search requests submitted to an internal search service that may be appropriate as keywords for advertisement sets to be submitted to advertisement placement services. The identify keywords from internal search component 125 generates advertisement sets, stores them in the advertisement set store 123, and provides them to the advertisement submitter service 140 for submission to an advertisement placement service.

The advertisement system 110 may also include an augment keywords component 131 and an evaluate performance of augmented keywords component 132. The augment keywords component 131 identifies candidate keywords for augmentation, identifies augmentation terms for the candidate keywords, and submits the augmented advertisement sets to the advertisement submitter service 140. The augment keywords component 131 also updates the advertisement set store 123 and the augmented keyword store 124. The augment keywords component 131 invokes an identify candidate keywords for augmentation component 133 and an identify augmentation terms for candidate keywords component 134. The identify candidate keywords for augmentation component 133 invokes an evaluate performance of keyword component 135 to identify keywords whose performance satisfies an augmentation criterion. The identify augmentation terms for candidate keywords component 134 identifies appropriate augmentation terms for each candidate keyword. The evaluate performance of augmented keyword component 132 may be invoked periodically to evaluate the performance of augmented advertisement sets. The component may invoke the evaluate performance of keyword component 135 to use the same augmentation criterion as a re-augmentation criterion (as indicated by the dashed line) or may implement a different criterion for re-augmentation.

Figure 2:
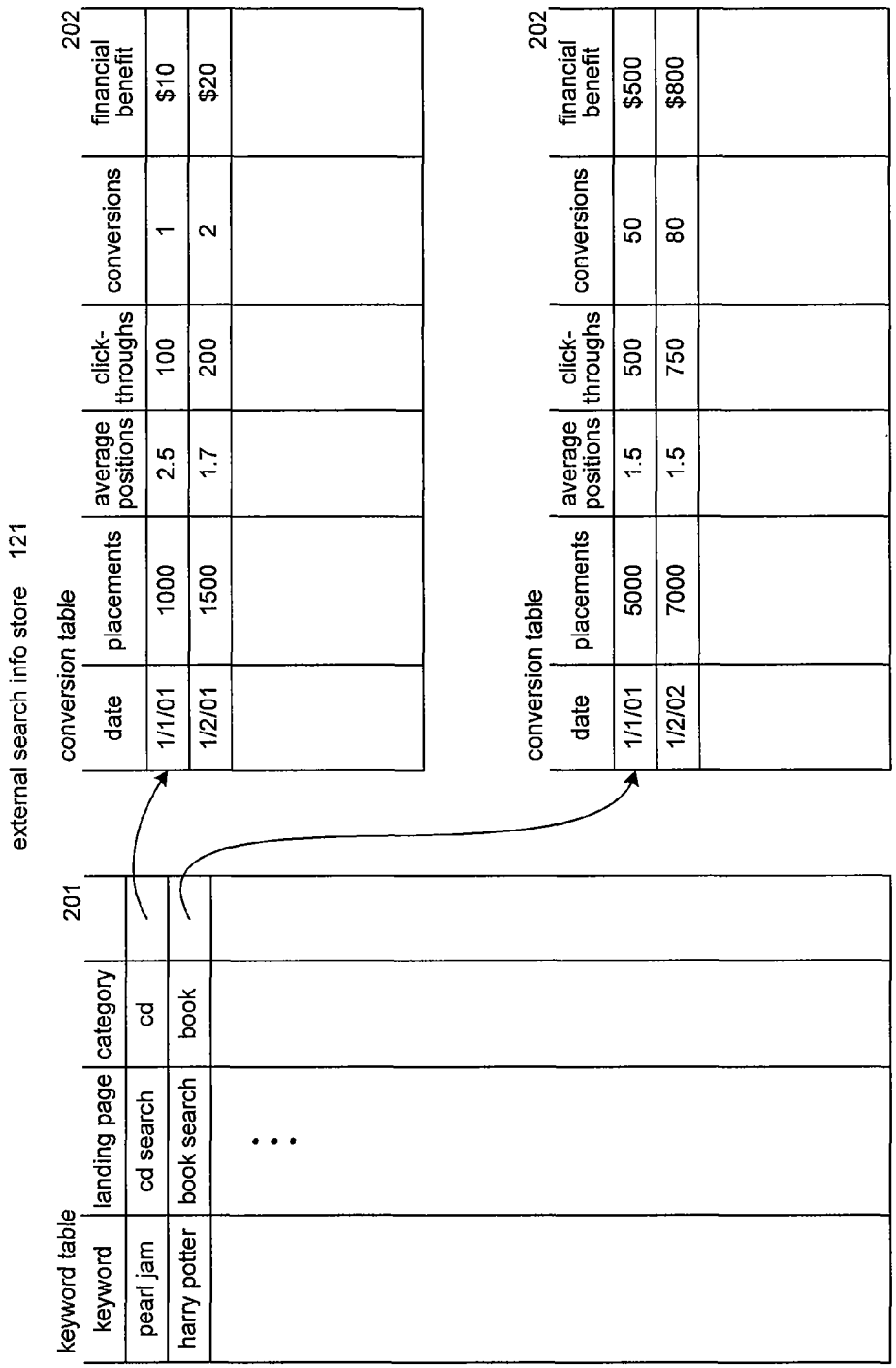
FIG. 2 is a block diagram that illustrates a logical organization of an external search information store of the advertisement system in some embodiments.

FIG. 2 is a block diagram that illustrates a logical organization of an external search information store of the advertisement system in some embodiments. The external search information store 121 may include a keyword table 201 that contains an entry for each keyword of an advertisement set. Each entry identifies a keyword (e.g., "Pearl Jam") along with an indication of the category (e.g., "CD") and the landing page (e.g., "CD search"). Each entry also contains a reference to a conversion table 202. Each conversion table 202 contains an entry for each time period for which the advertisement set of the keyword was submitted. Each entry may indicate the number of times the advertisement placement service selected the advertisement set for placement, the average position of placements, the number of clickthroughs for the advertisement set, the number of resulting conversions, the financial benefit, and so on.

Figure 3:
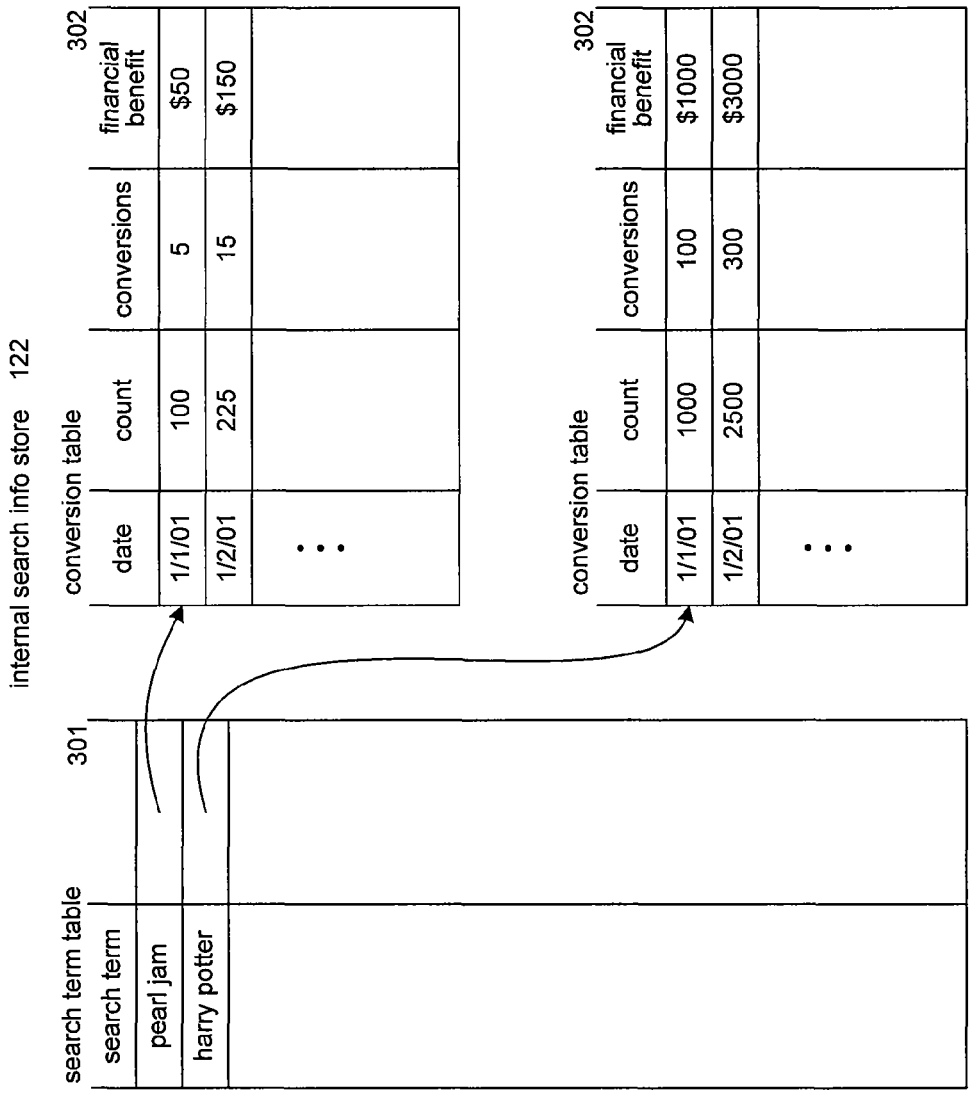
FIG. 3 is a block diagram that illustrates a logical organization of an internal search information store of the advertisement system in some embodiments.

FIG. 3 is a block diagram that illustrates a logical organization of an internal search information store of the advertisement system in some embodiments. The internal search information store 122 may include a search term table 301. The search term table 301 may include an entry search term that identifies each search term and includes a reference to a conversion table 302. The conversion table 302 may include an entry for each time period for which search information was collected. Each entry may include a count of the number of times the search term was submitted to an internal search service, the number of resulting conversions of those submissions, the resulting financial benefit, and so on.

The computing device on which the advertisement system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. A computer-readable medium may be a computer program product comprising computer-readable program code means that implement functions of the system. In addition, the instructions, data structures, and message structures may be stored or transmitted via a data transmission medium, such as a signal on a communications link. The described data structures represent one possible logical organization of the data. One skilled in the art will appreciate that many different logical and physical data organizations can be used. Various communications links may be used, such as the Internet, a local area network, a wide area network, a point-to-point dial-up connection, a cell phone network, and so on.

Embodiments of the advertisement system may be implemented in or used in conjunction with various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The advertisement system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
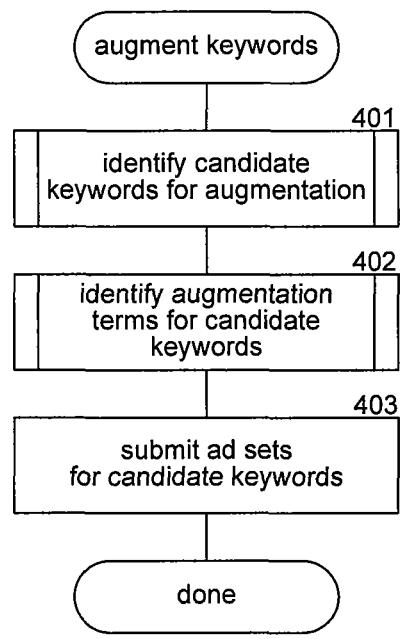
FIG. 4 is a flow diagram that illustrates the overall processing of an augment keywords component of the advertisement system in some embodiments.

FIG. 4 is a flow diagram that illustrates the overall processing of an augment keywords component of the advertisement system in some embodiments. The component identifies candidate keywords and augmentation terms and then submits the augmented advertisement sets for placement by advertisement placement services. In block 401, the component invokes the identify candidate keywords for augmentation component. In block 402, the component invokes the identify augmentation terms for candidate keywords component to identify an augmentation term for each candidate keyword. In block 403, the component submits to an advertisement placement service the augmented advertisement sets corresponding to the candidate keywords and then completes.

Figure 5:
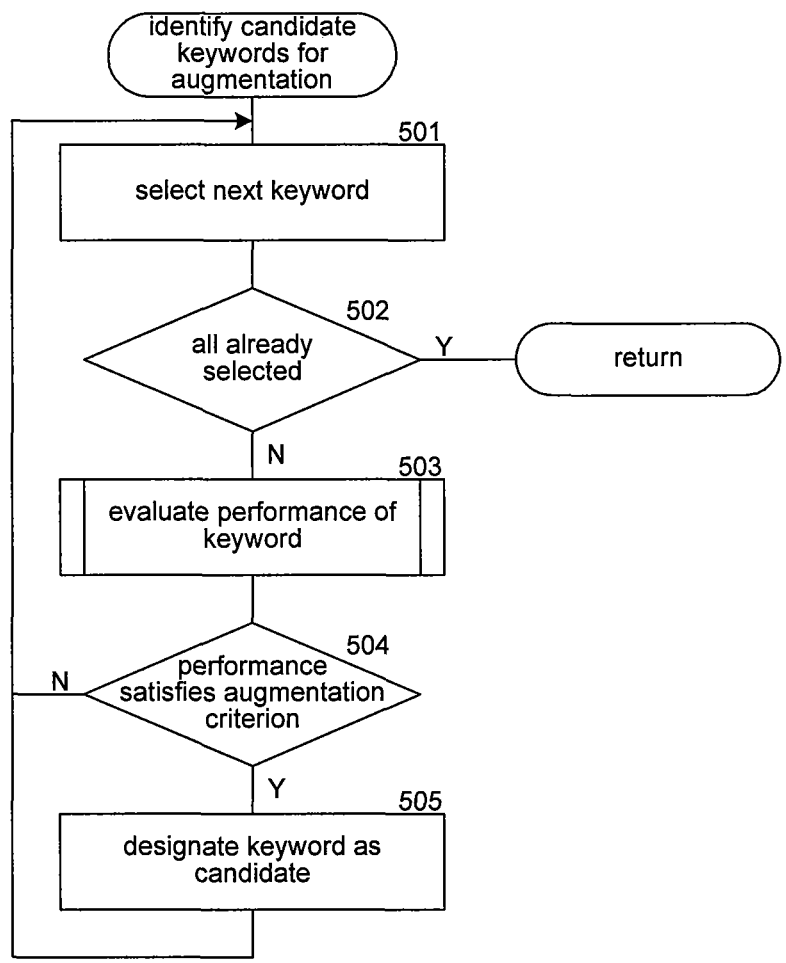
FIG. 5 is a flow diagram that illustrates the processing of an identify candidate keywords for augmentation component of the advertisement system in some embodiments.

FIG. 5 is a flow diagram that illustrates the processing of an identify candidate keywords for augmentation component of the advertisement system in some embodiments. The component loops selecting keywords of the advertisement sets of the advertisement set store, evaluates their performance, and designates as candidate keywords those that satisfy the augmentation criterion. In block 501, the component selects the next keyword from an advertisement set of the advertisement set store 123. In decision block 502, if all the keywords have already been selected, then the component returns, else the component continues at block 503. In block 503, the component invokes the evaluate performance of keyword component. In decision block 504, if the performance satisfies the augmentation criterion, then the component continues at block 505, else the component loops to block 501 to select the next keyword. In block 505, the component designates the keyword as a candidate keyword for augmentation and then loops to block 501 to select the next keyword.

Figure 6:
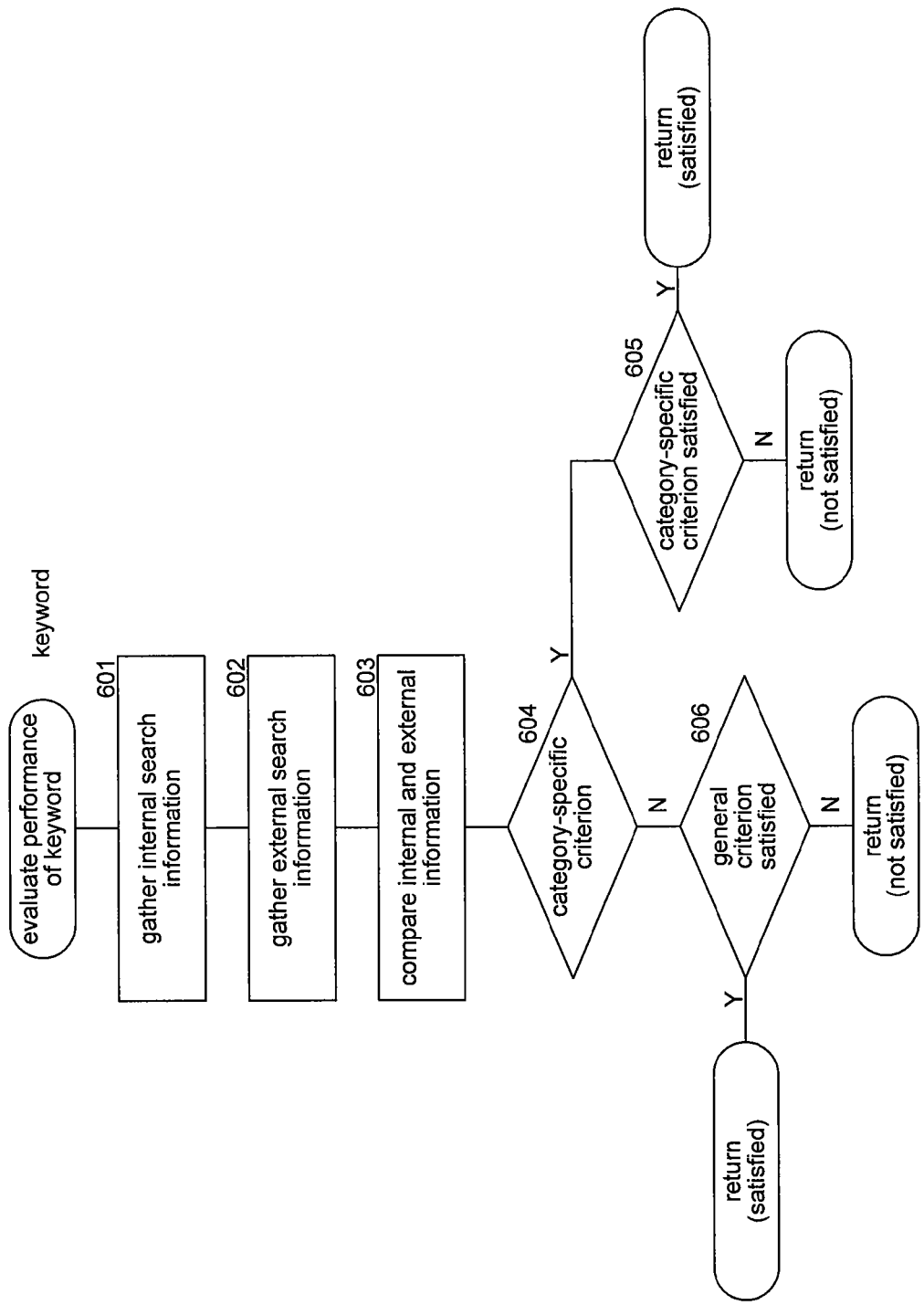
FIG. 6 is a flow diagram that illustrates the processing of an evaluate performance of keyword component of the advertisement system in some embodiments.

FIG. 6 is a flow diagram that illustrates the processing of an evaluate performance of keyword component of the advertisement system in some embodiments. The component determines whether the performance of the passed keyword satisfies an augmentation criterion that may be category-specific. In block 601, the component gathers internal search information relating to the keyword from the internal search information store 122. In block 602, the component gathers external search information for the keyword from the external search information store 121. In block 603, the component compares the internal and external search information that has been gathered. For example, the component may compare the internal and external conversion rates. In decision block 604, if the category of the keyword has a category-specific criterion, then the component continues at block 605, else the component continues at block 606. In decision block 605, if a category-specific augmentation criterion is satisfied, then the component returns an indication of satisfied, else the component returns an indication of not satisfied. In decision block 606, if a general augmentation criterion is satisfied, then the component returns an indication of satisfied, else the component returns an indication of not satisfied.

Figure 7:
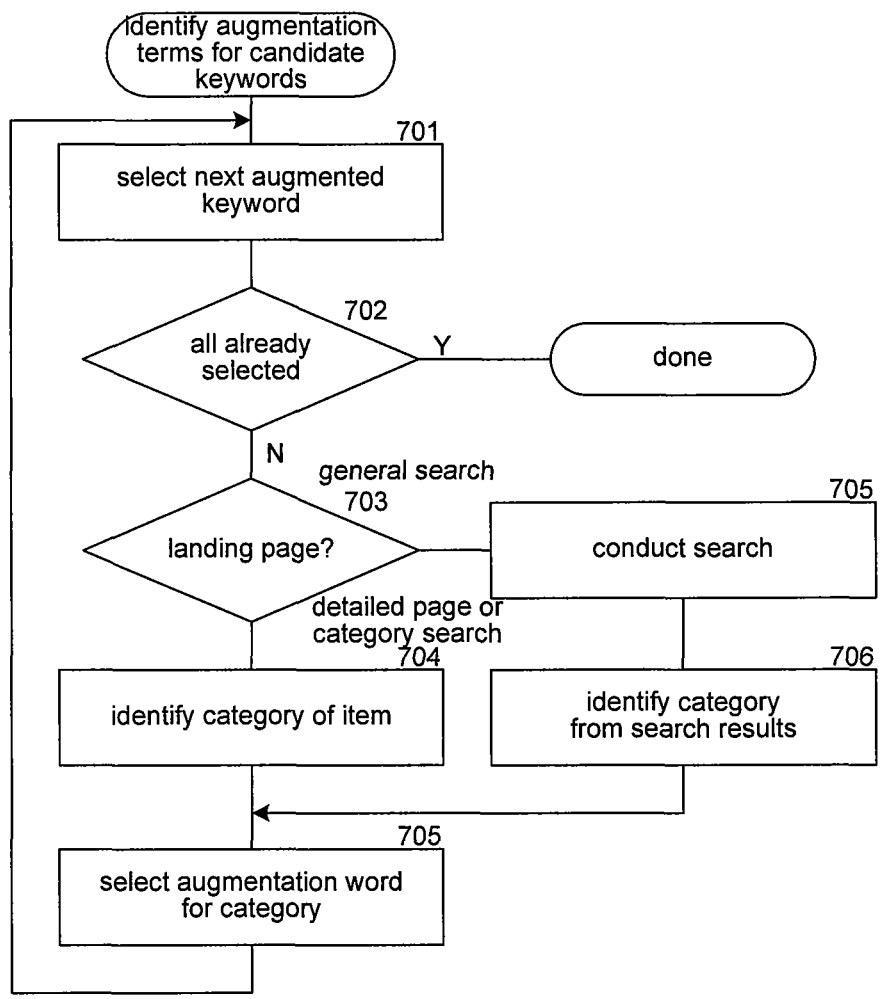
FIG. 7 is a flow diagram that illustrates the processing of an identify augmentation terms for candidate keywords component of the advertisement system in some embodiments.

FIG. 7 is a flow diagram that illustrates the processing of an identify augmentation terms for candidate keywords component of the advertisement system in some embodiments. The component loops selecting the candidate keywords and selecting an augmentation term for each candidate keyword that is category-specific. In an alternate embodiment, none of the categories has category-specific augmentation terms or certain categories may have category-specific augmentation terms. In block 701, the component selects the next candidate keyword. In decision block 702, if all the candidate keywords have already been selected, then the component returns, else the component continues at block 703. In decision block 703, if the landing page is a general search landing page, then the component continues at block 705, else the landing page is a detailed product page or a category search landing page and the component continues at block 704. In block 704, the component identifies the category of the item of the detailed page or the category search. In block 705, the component conducts a general search (i.e., not limited to a category) with the internal search service with the selected candidate keywords as the search request. In block 706, the component identifies an appropriate category from the search results. In block 707, the component selects an augmentation word that is appropriate for the identified category and then loops to block 701 to select the next candidate keyword.

Figure 8:
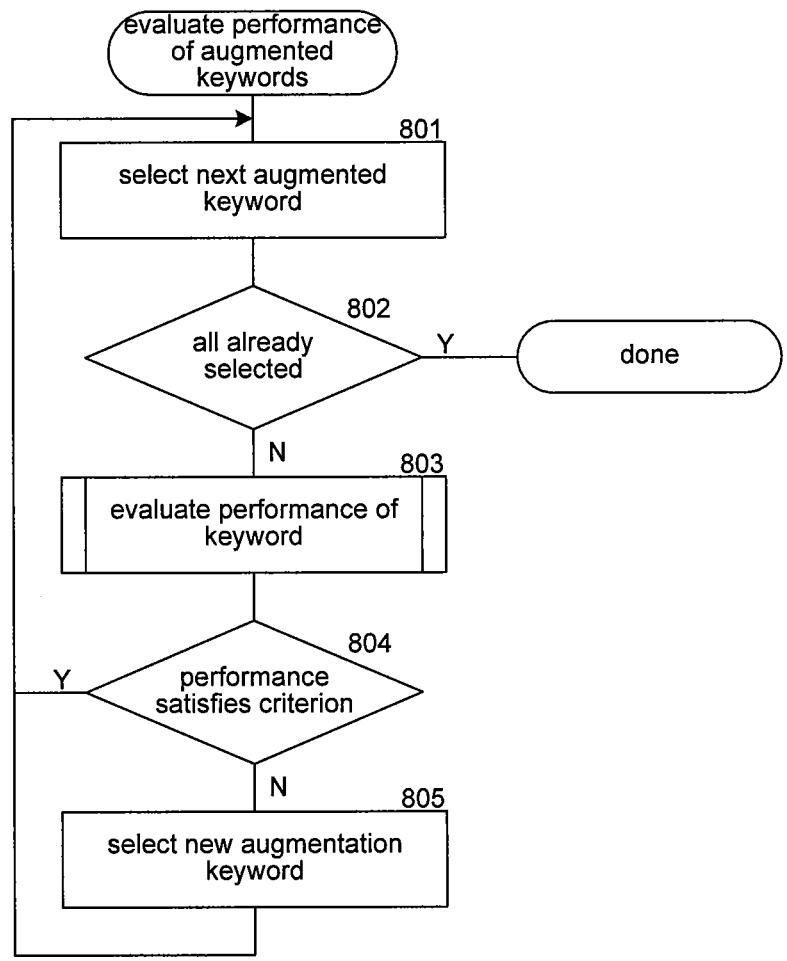
FIG. 8 is a flow diagram that illustrates the processing of an evaluate performance of augmented keywords component of the advertisement system in some embodiments.

FIG. 8 is a flow diagram that illustrates the processing of an evaluate performance of augmented keywords component of the advertisement system in some embodiments. The component may be invoked periodically to evaluate the performance of augmented keywords to determine whether those keywords should be augmented with a different augmentation term. In block 801, the component selects the next augmented keyword from the augmented keyword store. In decision block 802, if all the augmented keywords have already been selected, then the component completes, else the component continues at block 803. In block 803, the component may invoke the evaluate performance of augmented keyword component to compare the performance of the augmented keyword with the advertisement placement service to the performance of the keyword with the internal search service. The component may use a re-augmentation criterion that is the same as or different from the original augmentation criterion. In decision block 804, if the performance satisfies a re-augmentation criterion, then the component loops to block 801 to select the next augmented keyword, else the component continues at block 805. In block 805, the component selects a new augmentation term for the keyword and then loops to block 801 to select the next augmented keyword. The component may also submit the newly augmented advertisement sets for placement by an advertisement placement service and update the advertisement set store and the augmented keyword store.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the advertisement system may be used to submit augmented advertisement sets to advertisement placement services that serve advertisements for placement on web pages based on the content of the web page. For example, if the web page contains the phrase "Harry Potter," then the advertisement placement service may select an advertisement set with the keyword "Harry Potter DVD" for placement on the web page. The creative of the advertisement set in such a case may correspond to a banner advertisement. Accordingly, the invention is not limited except as by the appended claims.

We claim:

1. A computer-implemented method in a computing device for augmenting keywords of advertisement sets, each advertisement set including at least one advertisement associated with a keyword, the method comprising:
under the control of one or more computer systems configured with executable instructions, the one or more computer systems configured to perform the steps of:
providing an internal search service associated with an advertiser's web site and configured to facilitate an internal search of an electronic catalog of items provided by an advertiser on the web site;
identifying from currently submitted advertisement sets candidate keywords for augmentation by, for each advertisement set:
determining a first value corresponding to a first financial benefit to the advertiser resulting from using the advertisement set in the internal search provided by the advertiser and facilitated by the internal search service associated with the advertiser, the first financial benefit being derived from purchases of an item by users who selected a link for the item in a first search result associated with the internal search of the electronic catalog facilitated by the internal search service, and wherein the first value includes an internal conversion rate associated with a keyword included in the advertisement set;
determining a second value corresponding to a second financial benefit to the advertiser resulting from using the advertisement set in an external search that is external to the advertiser's web site, the second financial benefit being derived from purchases of the item by users who selected a link for the item in a second search result associated with the external search, and wherein the second value includes an external conversion rate associated with the keyword included in the advertisement set;
determining that the first value exceeds the second value by a predetermined threshold; and identifying the keyword in the advertisement set as a candidate keyword for augmentation; and for each identified candidate keyword, identifying an augmentation term to be added to the candidate keyword of the advertisement set to provide an augmented keyword for an augmented advertisement set; and submitting the augmented advertisement set for placement with the advertisement placement service.

2. The computer-implemented method of claim 1 wherein the first value is derived from internal search information obtained from the internal search and the second value is derived from external search information obtained from the external search to determine whether a keyword satisfies an augmentation criterion.

3. The computer-implemented method of claim 2 wherein the external search information includes performance information resulting from submitting advertisement sets with the keyword to the advertisement placement service.

4. The computer-implemented method of claim 3 wherein the advertisement placement service is a search engine service.

5. The computer-implemented method of claim 2 wherein the internal search information includes performance information for search terms submitted when searching an electronic catalog of items and the external search information includes performance information for the advertisement set with the keyword submitted to the advertisement placement service.

6. The computer-implemented method of claim 2 wherein the augmentation criterion is based on comparison of conversion rates indicated by the internal search information and the external search information, wherein a conversion rate indicated by the internal search information comprises the first value and a conversion rate indicated by the external search information comprises the second value.

7. The computer-implemented method of claim 6 wherein the augmentation criterion comprises the predetermined threshold that specifies a threshold percentage difference between conversion rates.

8. The computer-implemented method of claim 2 wherein the augmentation criterion is based on conversion rate indicated by the external search information and popularity of the keyword as a search request indicated by the internal search information.

9. The computer-implemented method of claim 2 wherein the augmentation criterion is specific to a category associated with the advertisement set.

10. The computer-implemented method of claim 1 wherein the identifying of an augmentation term includes selecting an augmentation term based on a category associated with an advertisement set.

11. The computer-implemented method of claim 1 wherein the augmented advertisement set with the augmented keyword is submitted for placement but an un-augmented advertisement set with the un-augmented keyword is no longer submitted for placement.

12. The computer-implemented method of claim 1 wherein both the augmented advertisement set and the un-augmented advertisement set are submitted for placement.

13. The computer-implemented method of claim 1 further comprising:

analyzing performance of the augmented advertisement sets; and when a re-augmentation criterion is satisfied, identifying a different augmentation term to be added to a keyword of the augmented advertisement set.

14. The computer-implemented method of claim 1 wherein the augmentation term is a commercial term.

15. The computer-implemented method of claim 14 wherein the commercial term is selected from the group consisting of buy, purchase, sale, and bargain.

16. The computer-implemented method of claim 1 wherein the augmentation term is derived from product description information for the product being advertised.

17. The computer-implemented method of claim 1 wherein the augmentation term is derived from category description information for the category of products being advertised.

18. The computer-implemented method of claim 1 wherein the advertisement set includes a landing page of comprising a search page specifying a search that includes an original keyword of the advertisement set without the augmentation term.

19. The computer-implemented method of claim 1 wherein the identifying of an augmentation term identifies multiple augmentation terms from different classes of augmentation terms and wherein the keyword is augmented with multiple augmentation terms.

20. The computer-implemented method of claim 19 wherein augmentation terms are identified from commercial, product, and landing page augmentation terms.

21. The computer-implemented method of claim 1 including determining an indication of performance of a first augmentation term wherein the identifying of an augmentation term is based on the determined indication of performance.

22. The computer-implemented method of claim 1 including receiving an indication of performance of a first augmentation term wherein the identifying of an augmentation term is based on the determined indication of performance.

23. A non-transitory computer-readable storage medium having executable instructions for augmenting keywords of advertisement sets stored thereon that, when executed on a computer, cause the computer to:

provide an internal search service associated with an advertiser's web site and configured to facilitate an internal search of an electronic catalog of items provided by an advertiser on the web site;

generate an advertisement set based on analysis of searches of the electronic catalog of items conducted using the internal search service associated with the advertiser's web site, the advertisement set including a keyword derived from a search and an indication of what is being advertised with the keyword;

submit the generated advertisement set to an advertisement placement service that is external to the advertiser's web site;

determine whether the keyword of the advertisement set is a candidate keyword for augmentation by:

determining a first value corresponding to a first financial benefit to the advertiser resulting from using the advertisement set in the internal search of the electronic catalog of items facilitated by the internal search service, the first financial benefit being derived from purchases of an item by users who selected a link for the item in a first search result associated with the internal search of the electronic catalog facilitated by the internal search service, and wherein the first value including an internal conversion rate associated with a keyword included in the advertisement set;

determining a second value corresponding to a second financial benefit to the advertiser resulting from using the advertisement set in an external search, the external search performing a search that is external to the advertiser's web site, the second financial benefit being derived from purchases of the item by users who selected a link for the item in a second search result associated with the external search, and wherein the second value includes an external conversion rate associated with the keyword included in the advertisement set;

determining that the first value exceeds the second value by a predetermined threshold; and identifying the keyword in the advertisement set as a candidate keyword for augmentation; and for each identified candidate keyword, identify an augmentation term to be added to the candidate keyword to provide an augmented advertisement set with an augmented keyword; and submit the augmented advertisement set for placement with the advertisement placement service.

24. The non-transitory computer-readable storage medium of claim 23 wherein the advertisement placement service is a search engine service.

25. The non-transitory computer-readable storage medium of claim 23 wherein a keyword is determined to be a candidate keyword based on comparison of the conversion rate of searches of the search service with the keyword as the search request and the conversion rate associated with placement of the advertisement set with the keyword with the advertisement placement service.

26. The non-transitory computer-readable storage medium of claim 23 wherein the keyword is determined to be a candidate keyword based on popularity of the keyword in searches of the search service and the conversion rate associated with placement of the advertisement set with the keyword by the advertisement placement service.

27. The non-transitory computer-readable storage medium of claim 23 wherein the determining of whether a keyword is a candidate keyword is based on an augmentation criterion that is specific to a category associated with the advertisement set.

28. The non-transitory computer-readable storage medium of claim 23 wherein the identifying of an augmentation term includes selecting an augmentation term based on a category associated with the advertisement set.

29. The non-transitory computer-readable storage medium of claim 23 further comprising:

analyzing performance of the augmented advertisement set with the augmented keyword; and when a re-augmentation criterion is satisfied, identifying a different augmentation term to be added to the keyword.

30. The non-transitory computer-readable storage medium of claim 23 wherein the identifying of an augmentation term identifies multiple augmentation terms from different classes of augmentation terms and wherein the keyword is augmented with multiple augmentation terms.

31. The non-transitory computer-readable storage medium of claim 30 wherein the augmentation terms are identified from commercial, product, and landing page augmentation terms.

32. The non-transitory computer-readable storage medium of claim 23 including determining an indication of performance of a first augmentation term wherein the identifying of an augmentation term is based on the determined indication of performance.

33. The non-transitory computer-readable storage medium of claim 23 including receiving an indication of performance of a first augmentation term wherein the identifying of an augmentation term is based on the determined indication of performance.

34. A computing device for augmenting keywords of advertisement sets, each advertisement set including at least one advertisement associated with a keyword, the computing device comprising:

a processor; and a memory having computer-executable instructions stored thereon that, when executed on the processor, cause the processor to:

provide an internal search service associated with an advertiser's web site and configured to facilitate an internal search of an electronic catalog of items provided by an advertiser on the web site;

identify a candidate keyword of an advertisement set by:

determining a first value corresponding to a first financial benefit to the advertiser resulting from using the advertisement set in the internal search of the electronic catalog of items provided by the advertiser and facilitated by the internal search service, the first financial benefit being derived from purchases of an item by users who selected a link for the item in a first search result associated with the internal search of the electronic catalog facilitated by the internal search service, and wherein the first value includes an internal conversion rate associated with a keyword included in the advertisement set;

determining a second value corresponding to a second financial benefit to the advertiser resulting from using the advertisement set in an external search that is external to the advertiser's web site, the second financial benefit being derived from purchases of the item by users who selected a link for the item in a second search result associated with the external search, and wherein the second value includes an external conversion rate associated with the keyword included in the advertisement set;

determining that the first value exceeds the second value by a predetermined threshold; and identifying the keyword in the advertisement set as a candidate keyword for augmentation;

identify an augmentation term to be added to the candidate keyword of the advertisement set to generate an augmented advertisement set with an augmented keyword; and submit the advertisement set for placement with the advertisement placement service.

35. The computing device of claim 34 including an internal search store that stores information relating to performance of the keyword as a search term with the internal search service.

36. The computing device of claim 34 including an external search store that stores information relating to performance of the advertisement set with the advertisement placement service.

37. The computing device of claim 34 wherein a candidate keyword is selected based on comparison of a conversion rate of the keyword as a search term with the internal search service and a conversion rate of the advertisement set with the keyword.

38. The computing device of claim 34 wherein the computer-executable instructions further cause the processor to evaluate performance of the augmented advertisement set with the augmented keyword and identify a different augmentation term for the keyword when the performance satisfies a re-augmentation criterion.

* * * * *